ELECTRONIC IMPULSE-COUNTING AND DATA-STORING CIRCUITS

Filed Oct. 15, 1943 4 Sheets-Sheet 1

INVENTORS
JOSEPH R. DESCH AND
ROBERT E. MUMMA

BY Carl Beust
THEIR ATTORNEY

ELECTRONIC IMPULSE-COUNTING AND DATA-STORING CIRCUITS

Filed Oct. 15, 1943 4 Sheets-Sheet 2

INVENTORS
JOSEPH R. DESCH AND
ROBERT E. MUMMA
BY Carl Beust
THEIR ATTORNEY

June 12, 1951 J. R. DESCH ET AL 2,556,614

ELECTRONIC IMPULSE-COUNTING AND DATA-STORING CIRCUITS

Filed Oct. 15, 1943 4 Sheets-Sheet 3

INVENTORS
JOSEPH R. DESCH AND
ROBERT E. MUMMA

BY

THEIR ATTORNEY

ELECTRONIC IMPULSE-COUNTING AND DATA-STORING CIRCUITS

INVENTORS
JOSEPH R. DESCH AND
ROBERT E. MUMMA

BY Earl Bennett

THEIR ATTORNEY

Patented June 12, 1951

2,556,614

UNITED STATES PATENT OFFICE 2,556,614

ELECTRONIC IMPULSE-COUNTING AND DATA-STORING CIRCUITS

Joseph R. Desch, Oakwood, and Robert E. Mumma, Dayton, Ohio, assignors to The National Cash Register Company, Dayton, Ohio, a corporation of Maryland Application October 15, 1943, Serial No. 506,320

10 Claims. (Cl. 315—230)

This invention relates to a receiving apparatus for use in a system of communicating data, and is particularly concerned with an apparatus for receiving data in the form of a succession of spaced bursts of signals containing various predetermined members of rapidly recurring similar discrete signals according to the data being transmitted, in which apparatus a single translating means operates over and over again to control a plurality of storage devices which store the data represented by the successive bursts of signals.

In the communication system in which the novel receiving apparatus is used, each of the several symbols that may be transmitted is represented by a burst or train of signals containing a predetermined number of substantially identical signals having like significance. The symbols to be transmitted are set up in a sending apparatus which contains means for transforming them into bursts of signals and generating the number of signals required in each burst according to the symbol being sent. The signals by which the symbols are represented may take any desired form; for instance, they may consist of discrete rapidly recurring impulses and/or interruption or modulation of a continuous carrier wave. The transmission from the sending apparatus to the receiving apparatus may be made in any desired manner, as, for instance, over a wire or by radio.

The bursts of signals representing the different symbols being transmitted are sent one after another over a single communication channel, with a predetermined time interval or space between the bursts. The signals in the bursts are used to operate the novel receiving apparatus to set up direct representations of the symbols, and the spaces between the bursts are used to enable means in the receiving apparatus to generate control signals which control the operation of storage means in the receiving apparatus to store the direct representations of the symbols represented by successive bursts of signals.

The novel receiving apparatus contains translating means upon which the signals are impressed, and which is differentially operable to translate the different numbers of impulses into direct representation of the symbols. The translating means is operable over and over to translate the different bursts into the various direct representations of the symbols and is also operable to control a plurality of storing means which are rendered effective one after another to store these direct representations of the symbols.

It is an object of the invention, therefore, to provide a receiving apparatus having a single translating means which is operable over and over to translate groups of signals, as they are received, into direct representations of symbols.

A further object of the invention is to provide a plurality of storage devices to be associated with a translating means to be set thereby according to the translation of various ones of a plurality of bursts of signals.

Another object of the invention is to provide a receiving apparatus with a single electronic translating means for translating incoming groups of signals into direct representations of data represented thereby and having great enough speed that the one translating device can be used over and over to translate successive groups of signals.

Another object of the invention is to provide a receiving apparatus with a plurality of electronic storage devices which may be related to a single translating means and may be selectively operated one after another to store the various symbols making up the data being received.

Another object of the invention is to provide a receiving apparatus with a plurality of storage devices for storing symbols making up the data which is received, and a control means for causing the storage of each symbol as soon as that symbol is received.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

*General description*

Figure 1:
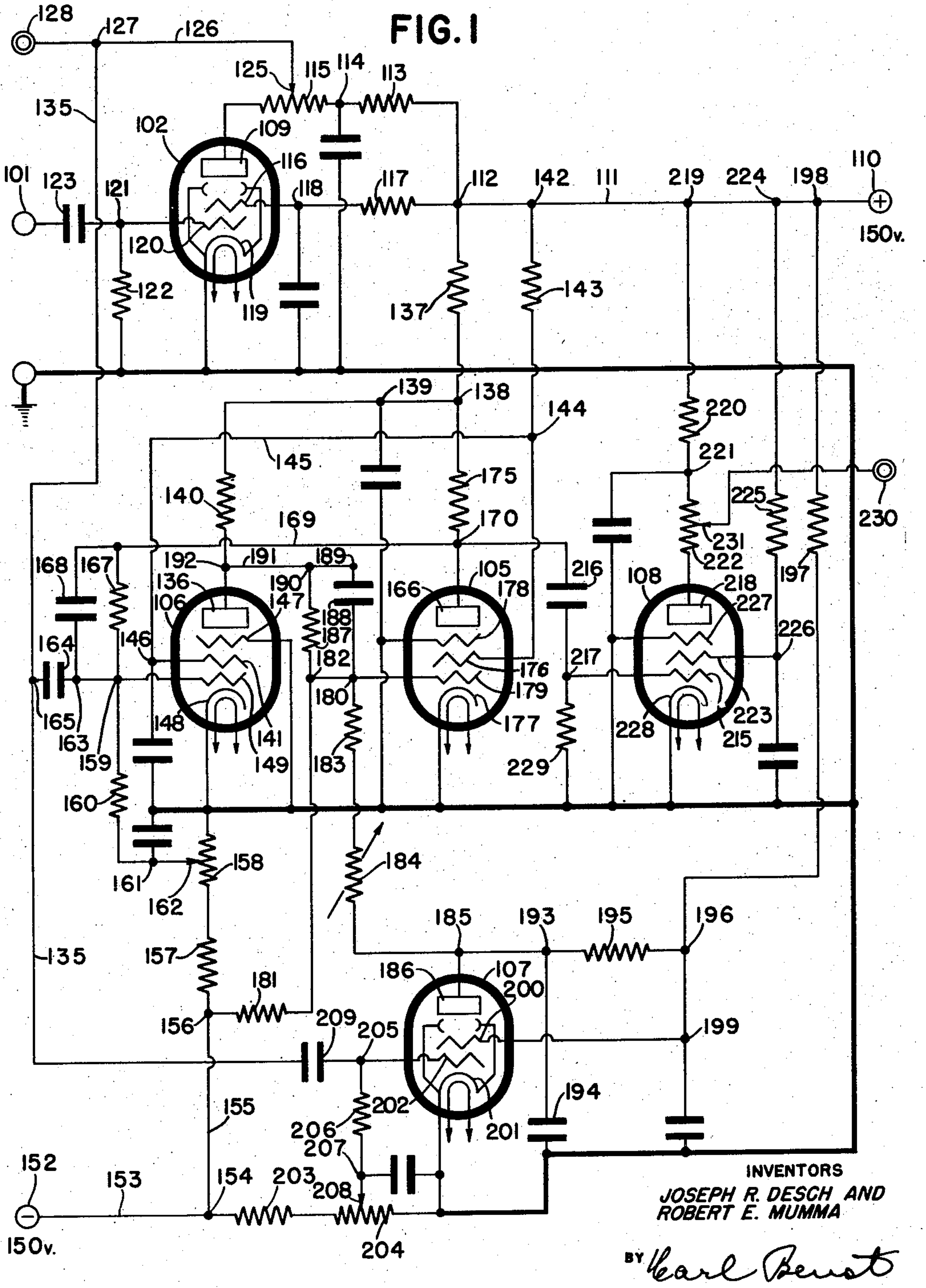
Fig. 1 shows the means in the receiving apparatus upon which the incoming signals are impressed and which generates a control signal after each burst of signals has been received.

The symbols which may be sent and received by the novel apparatus may represent any selected data such as the digits of a numerical notation, the letters of the alphabet or any other arbitrary data which may be chosen.

The disclosed embodiment of the invention is shown with a capacity for storing five symbols, and is arranged to receive the symbols representing the digits "0" to "9" inclusive, of a numerical notation. For the purposes of this disclosure, the signals by which the symbols are represented will consist of discrete rapidly recurring negative impulses of substantially uniform amplitude which may be transmitted to the input terminal of the receiving apparatus by any suitable means. However, it is not intended to limit the invention to the storage of five symbols representing digit values, or to the use of negative signal impulses, because the symbols may represent other data, the capacity of the storage facilities in the apparatus may vary, and other equivalent forms of signals, per se, may be used in carrying out the invention without departing from the substance thereof.

The receiving apparatus contains means upon which the bursts of incoming signal impulses are impressed, and which is capable of causing a control impulse to be generated after each burst of impulses has been received; a translating means for translating the bursts of impulses into direct representations of the symbols which the bursts represent; a plurality of storage devices controlled by the translating means to store the symbols as they are translated by the translating means; and a switching means operated by the control signals for rendering the storage devices operable one after another to store the symbols.

The means upon which the incoming impulses are impressed includes a phase changing tube for changing the negative impulses to positive impulses, so that they may be used to operate the translating means, and also includes a plurality of tubes which are jointly operable to produce a control impulse after each burst of impulses has been received.

The translating means consists of a bank of gaseous electron tubes and contains a resetting tube, a priming tube, and a tube for representing each possible symbol that may be transmitted. The resetting tube is fired and rendered conducting by the control impulse which is generated between bursts of signal impulses, and when the resetting tube is fired and rendered conducting, it will automatically fire the priming tube. The priming tube is effective to render the "0" symbol representing tube responsive to the first signal impulse which is received. The symbol-representing tubes are connected to be fired one after another in response to the incoming signal impulses, the order of the firing beginning with the "0" tube, and continuing through the tubes "1" through "9" in that order. The tubes of the bank are so inter-connected that any tube in the bank will be effective, when it is fired and rendered conducting, to extinguish any previously conducting tube in the bank, so that at the end of a translating operation the tube that is conducting will correspond to the symbol represented by the burst, and will be effective to control the storage devices to store a representation of this symbol in the storage device that is to be operated at this time. The resetting tube will be operable when it is fired, to extinguish the symbol representing tube which remained conducting after a previous translating operation, and thus is effective to clear any previous setting of the translating means and to prepare or reset the translating means for a further translating operation.

The storage devices are gaseous electron tubes having a plurality of independently operable discharge paths therein. The discharge paths in each storage device correspond to the various ones of the symbol-representing tubes of the translating means, and, when the various storage devices are rendered operable, the path corresponding to the last tube to operate in the translating means will be rendered conducting and will remain conducting to store a representation of the symbol.

The switching means contains a bank of sequentially operable gaseous electron tubes which are operable one at a time in sequence in response to the generated control impulses. The bank contains a tube for each storage device, and as the tubes become conducting one after another, they will selectively prepare the storage devices for operation, so that the storage devices may be operated one at a time in succession to store the representation of the symbols which correspond to the several bursts of signals which are received.

These component parts of the receiving apparatus and their operation in the receiving apparatus will now be described in detail.

*Detailed description*

The disclosed embodiment of the invention is adapted to receive five symbols automatically in succession in the form of the bursts of negative impulses having substantially the same amplitude, which bursts contain different numbers of these impulses, depending upon the particular symbols to be represented thereby. The burst by which the symbol "0" is represented contains one impulse; the burst for the symbol "1" contains two impulses; and the burst for the symbol "2" contains three impulses. This relation between the number of impulses and the symbols which they represent extends to the symbol "9," which is represented by ten impulses; however, the invention is not limited to this particular relation between the symbols and the numbers of impulses assigned thereto, as any desired number of impulses can arbitrarily be assigned to represent any symbol.

In the following description, the numerals "I," "II," "III," "IV," and "V" indicate the order in which the symbols are received, and similar numerals will be applied to the parts of the apparatus which are related to the particular operation during which the reception of these symbols takes place.

In this disclosure, the values of the various potentials referred to, are given with reference to ground. It is not intended that the invention be limited to the use of the particular potentials and values of resistance and capacitance given in the following description, because the potentials applied to the various elements of the tubes are merely selected as convenient potentials for the disclosure, and the circuit elements of resistance and capacitance correspond in relative value to the potentials chosen. It is obvious that other potentials may be used and the values of the circuit elements adjusted accordingly to maintain the proper relation between the various parts of the circuit. Throughout the drawings, the cathode heater elements are shown conventionally.

*Phase changing and control impulse generating means*

The incoming bursts of signal impulses, which are similar negative impulses, are impressed on the input terminal 101 (Fig. 1), and control the operation of a phase-changing vacuum tube 102 which converts them into bursts of positive impulses. The bursts of positive impulses from tube 102 are used to control an impulse-generating means to generate a control impulse after each burst of impulses has been received, and are also applied to a firing impulse conductor 103 (Fig. 2) which supplies these impulses to the symbol-representing tubes in the translating means to cause them to be fired.

The control impulse generating means is shown in Fig. 1, and includes a pair of vacuum tubes 105 and 106 connected to operate as a trigger pair; a slow-recovery control tube 107 for controlling the trigger-pair; and a phase-changing and impulse sharpening tube 108 controlled by tube 105 of the trigger pair for providing the control impulses after each burst of signal impulses, which control impulses are used to cause the operation of tubes in the various portions of the receiving apparatus in a manner to be described more fully hereinafter.

Tube 105 of the trigger pair is normally conducting, and tube 106 is normally non-conducting; however, the first impulse of a burst is effective to render tube 106 conducting and tube 105 non-conducting. The impulses of a burst are also impressed on the control tube 107 and cause this tube to apply a bias on tube 105 as long as impulses of a burst are being received, which bias prevents the trigger pair from returning to its normal condition until the space occurs between bursts. When the trigger pair returns to its normal condition, tube 105 becomes conducting and controls the phase changing and impulse sharpening tube 108 to reduce conduction therein, and thereby to cause a positive impulse to be formed, which impulse is the control impulse referred to above.

The circuits described hereinbelow will enable these tubes to function to produce a control impulse after each burst of symbol-representing impulses has been received.

The phase-changing tube 102 is a zero-biased tube and is normally conducting. Anode 109 has a normal positive potential of about 18 volts which is derived from a positive potential of 150 volts applied at terminal 110, the circuit from 110 to the anode 109 extending over conductor 111, point 112, resistor 113 of 500 ohms, point 114, and resistor 115 of 5000 ohms. Point 114 is connected to ground over a stabilizing capacitor of .1 microfarad which absorbs any shock which might be caused by a sudden application or change of potential in this circuit. Screen grid 116 has a positive potential of 150 volts applied thereto from point 112 on conductor 111, over resistor 117 of 5000 ohms and point 118. Point 118 in this circuit is connected to ground over a stabilizing capacitor of 4 microfarads. The cathode 119 is directly connected to ground, and the control grid 120 is connected to ground over point 121 and resistor 122 of 25000 ohms. Point 121 in the circuit for the control grid 120 is electrostatically coupled to the input terminal 101 over a capacitor 123 of 10 micromicrofarads, and as the negative signal impulses are impressed on the terminal, they will cause the potential of the control grid 120 to become negative and cause conduction to cease in tube 102.

Since tube 102 is normally conducting, its anode 109 will have a normal positive potential of about 18 volts due to the potential drop across resistors 113 and 115, but, whenever a negative signal impulse is impressed on the control grid and stops conduction in the tube, the potential of the anode 109 will rise and provide a positive impulse. The amplitude of the incoming impulses which are transmitted to the receiving apparatus is made large enough that variations in the amplitude of the impulses may occur during transmission, and the received impulse will still be effective to cut off conduction in the phase-changing tube 102. A potential-tapping member 125 cooperates with resistor 115 and enables this potential rise, which occurs each time conduction ceases in tube 102, to be utilized as a positive impulse for controlling the control impulse generating means, and also to be impressed on the impulse conductor 103 (Fig. 2) for the translating means in the receiving apparatus.

The connection from the potential-tapping member 125 to the impulse conductor 103 extends over conductor 126, point 127, and terminal 128 (Fig. 1), which is connected to terminal 129 (Fig. 2), to which the impulse conductor 103 is connected. The manner in which the positive impulses on conductor 103 are effective to operate the translating means will be explained hereinafter.

Conductor 135 (Fig. 1) extends from point 127 and enables the positive impulses to control the control impulse generating means.

The tubes 105 and 106 are connected to form a trigger pair in which tube 105 is normally conducting and tube 106 is normally non-conducting. Anode 136 of tube 106 has a positive potential of 150 volts applied thereto from point 112 on conductor 111, over resistor 137 of 250 ohms, point 138, point 139 and resistor 140 of 5000 ohms; and, since tube 106 is normally non-conducting, anode 136 will be at a positive potential of 150 volts. Point 139 in this circuit is connected to ground over a stabilizing capacitor of .25 microfarad. Screen grid 141 of tube 106 has a positive potential of 150 volts applied thereto from point 142 on conductor 111, over resistor 143 of 3750 ohms, point 144, conductor 145, and point 146. Point 146 in this circuit is connected to ground over a stabilizing capacitor of 8 microfarads. The suppressor grid 147 and cathode 148 of tube 106 are connected directly to ground.

The control grid 149 of tube 106 is given a normal negative bias by being connected to a circuit which starts at terminal 152, upon which a negative potential of 150 volts is impressed, and continues to ground over conductor 153, point 154, conductor 155, point 156, resistor 157 of 30,000 ohms, and resistor 158 of 10,000 ohms, the connection of the control grid 149 to this circuit being over point 159, resistor 160 of 25,000 ohms, point 161, and potential-tapping member 162 which cooperates with resistor 158 and is adjustable to enable the proper negative bias to be obtained on the control grid 149. Point 161 in this circuit is connected to ground over a stabilizing capacitor of 8 microfarads. A further connection from point 159 in the control grid circuit extends over point 163 and capacitor 164 of 10 micro-microfarads to point 165 on conductor 135, upon which is impressed a positive impulse from tube 102 each time a signal impulse is received over input terminal 101, and enables these positive impulses to be impressed on control grid 149. The trigger connection between control grid 149 of tube 106 and the anode 166 of tube 105 extends from points 159 and 163, over resistor 167 of 50,000 ohms in parallel with capacitor 168 of 50 micro-microfarads, and over conductor 169 to point 170 in the anode potential supply circuit for tube 105.

Tube 105 is normally conducting. Anode 166 has a normal positive potential of 20 volts derived from a positive potential of 150 volts applied from point 112 on conductor 111, over resistor 137 and point 138, and over resistor 175 of 5,000 ohms to point 170. The screen grid 176 of tube 105 has a positive potential of 150 volts applied thereto by being connected at point 144 in the circuit, which also supplied this potential to the screen grid 141 of tube 106.

Cathode 177 and suppressor grid 178 of tube 105 are connected directly to ground.

The control grid 179 of tube 105 is connected at point 180 to a circuit which starts at point 154 on the negative potential supply conductor 153 and continues over conductor 155, point 156, resistor 181 of 150,000 ohms, points 182 and 180, resistor 183 of 100,000 ohms, and variable resistor 184 of 50,000 ohms to point 185, to which the anode 186 of control tube 107 is connected. The anode 186 is normally at a positive potential of about 90 volts and causes the potential of the control grid 179 to be such that tube 105 will be conducting; however, when tube 107 has been rendered conducting and the potential of its anode 186 has dropped, this drop will cause the potential of the control grid 179 to become sufficiently negative to prevent conduction from occurring in tube 105. The trigger connection between control grid 179 of tube 105 and the anode 136 of tube 106 extends from points 180 and 182 in the control grid circuit, over resistor 187 of 50,000 ohms and capacitor 188 of 50 micro-microfarads in parallel to points 189 and 190 on the conductor 191, which is connected to the potential supply circuit for anode 136 of tube 107 at point 192.

Control tube 107 is normally non-conducting, but is rendered conducting each time a positive impulse occurs on condenser 135.

In addition to the circuit traced earlier herein which extends to control grid 179 of tube 105, the anode 186 of control tube 107 is also connected to ground over points 185 and 193 and capacitor 194 of 900 micro-microfarads, and is connected to conductor 111 over points 185 and 193, resistor 195 of 75,000 ohms, point 196, resistor 197 of 500 ohms, and point 198. Point 196 is connected to ground over point 199 and a stabilizing capacitor of .25 microfarad. The screen grid 200 of the control tube 107 is connected over point 199 to point 196 in the circuit between the anode 186 and the conductor 111. The cathode 201 of the control tube 107 is connected directly to ground.

The control grid 202 for the control tube 107 is given a negative bias by being connected to a circuit which starts from point 154 on the negative potential supply conductor 153, and continues to ground over resistor 203 of 50,000 ohms and resistor 204 of 10,000 ohms, the connection of control grid 202 to this circuit being over point 205, resistor 206 of 300,000 ohms, point 207, and an adjustable potential-tapping member 208 which cooperates with resistor 204 to enable the desired negative bias to be applied to the control grid. Point 207 in this circuit is connected to ground over a stabilizing capacitor of 8 microfarads, and point 205 is electrostatically coupled over capacitor 209 of 50 micro-microfarads to conductor 135, which, as explained earlier herein, has a positive impulse impressed thereon each time a signal is received by the receiving apparatus.

Specifically, the operation and control of the tubes 105 and 106 of the trigger pair to produce control impulses are as follows.

When each symbol-representing impulse of a burst is impressed on the input terminal 101 of the receiving apparatus, it will cause the phase-changing tube 102 to be effective to impress a positive impulse on conductor 135. The first impulse of a burst on conductor 135 will be effective through capacitor 164 to reduce the bias on the control grid 149 of tube 106, and will render this tube conducting. When tube 106 becomes conducting, the potential of its anode 136 will drop, and this drop is effective through the trigger connection to render tube 105 non-conducting.

The first impulse on conductor 135 will also be effective, through capacitor 209, to reduce the bias on the control grid 202 of control tube 107 and render this tube conducting. When the control tube 107 becomes conducting, the potential of its anode 186 will drop, and, since the control grid 179 of tube 105 is connected to the anode 186, this potential drop will cause the potential of the control grid 179 to become sufficiently negative to prevent conduction from occurring in tube 105. The values for capacitor 194 and resistor 195 in the circuit with anode 186 are such that these elements will be effective to cause the potential of the anode to rise slowly after the momentary conduction in control tube 107, which was caused by the impulse, has ceased. The rise in anode potential is so regulated that the next impulse on conductor 135 is effective to render the control tube conducting again before the anode potential has recovered sufficiently to reduce the bias on control grid 179 to a point where tube 105 will become conducting. As the control tube 107 becomes conducting in response to the next impulse on conductor 135, the potential of the anode 186 will drop an amount equal to that which it had recovered after the previous conduction in tube 107 has ceased. Accordingly, the potential of the anode 186 will drop when the control tube 107 becomes conducting in response to the first impulse in a burst, and will fluctuate up and down as the successive impulses of the burst cause further conduction in the tube, but will not recover sufficiently during the receipt of a burst of impulses to enable the potential of the control grid 179 of tube 105 to acquire a value which will enable this tube to become conducting. During the time interval or space between successive bursts of impulses, however, control tube 107 will not be rendered conducting, and the potential of its anode 186 can recover sufficiently to be effective to reduce the bias on control grid 179 of tube 105, and that tube can be rendered conducting.

The adjustable resistor 184, which is included in the circuit between the anode 186 and the control grid 179, enables the selection of the point at which the potential rise of the anode 186 will cause the control grid 179 to lose control, and thus controls the maximum permissible interval that may occur between impulses of a burst without causing a control impulse to be generated.

As long as tube 105 remains non-conducting, it will be effective, through the trigger connection, to cause tube 106 to remain conducting between impulses; however, as tube 105 is rendered conducting during the interval between bursts, it will cause tube 106 to become non-conducting, and, as tube 106 becomes non-conducting, it will be effective through the trigger connection to cause a rapid rise in the rate of conduction in tube 105.

The potential of anode 166 of tube 105 will drop sharply as that tube becomes conducting, and will provide a negative impluse or control impulse after each burst of signal-representing impulses has been received. These control impluses are impressed on the control grid 215 of the phase-changing and impulse-sharpening tube 108, over point 170, capacitor 216 of 50 micro-microfarads, and point 217.

Thus, it is seen that the tubes of the trigger pair are controlled to produce a control impulse after each burst of symbol-representing impulses.

The phase-changing and impulse-sharpening tube 108 is normally conducting but is temporarily rendered non-conducting each time tube 105 becomes conducting after a burst of impulses has been received. The anode 218 of tube 108 has a positive potential of 150 volts applied thereto by a circuit starting from point 219 on conductor 111 and continuing over resistor 220 of 250 ohms, point 221, and resistor 222 of 5,000 ohms. Point 221 in this circuit is connected to ground over a stabilizing capacitor of .25 microfarad. Although anode 218 has a positive potential of 150 volts applied thereto, it will have a normal positive potential of about 20 volts because of the drop across resistor 222. Screen grid 223 has a positive potential of 150 volts applied thereto from point 224 on conductor 111, over resistor 225 of 3750 ohms, and point 226 Point 226 is connected to ground over a stabilizing capacitor of 8 microfarads. The suppressor grid 227 and cathode 228 of this tube are connected directly to ground, and its control grid 215 is connected to ground over point 217 and resistor 229 of 10,000 ohms.

When conduction is decreased in tube 108 as tube 105 becomes conducting, the potential of anode 218 will rise from its normal potential of 20 volts toward 150 volts, and this rise is impressed as a positive impulse on the terminal 230 from which the impulses are sent to control the various elements of the apparatus. The impulses are obtained by means of a potential-tapping member 231, which cooperates with resistor 222 and is also connected to terminal 230, which is connected to the various elements of the apparatus which are controlled by these impulses. The manner in which these impulses cause the various elements to operate will be explained fully hereinafter.

*Translating means*

The translating means includes a bank of gaseous electron tubes which may be differentially operated over and over to translate the different numbers of signals in the bursts into direct representations of the symbols represented thereby and to control the storage devices to store these direct representations of the symbols.

Figure 2:
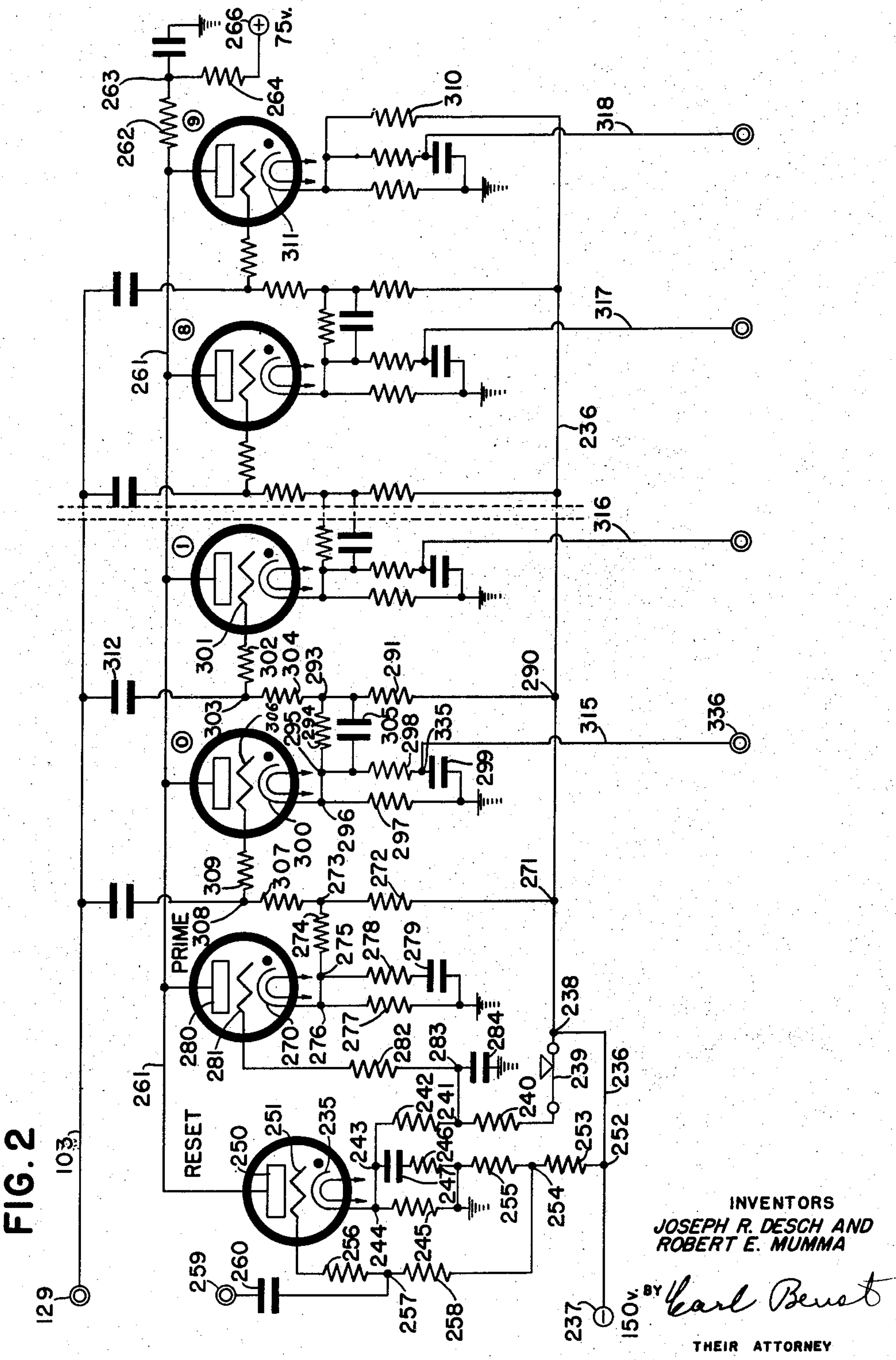
Fig. 2 shows the single translating means which is operable to translate the signals of a burst of signals into a direct representation of the symbol represented by the burst and is operable over and over to translate successive bursts as they are received.

Referring to Fig. 2, which shows the translating means, it is seen that this means is made up of a bank of gaseous electron tubes. These tubes are of the type having an internal potential drop of about 15 volts when conducting, and having an anode, a cathode, and a control grid which is given a negative bias with respect to the cathode and will prevent the tube from firing until this bias is reduced to less than 15 volts negative with respect to the cathode.

Of the plurality of tubes making up the bank, there are a "Prime" tube and a symbol-representing tube for each possible symbol that may be transmitted. A resetting tube "Reset" is also associated with this bank of tubes to clear any previous setting therefrom and prepare it for further operation. In the instant embodiment, the receiving apparatus is arranged to receive symbols representing the digits "0" to "9" inclusive, so a tube is provided for each of these symbols, though in Fig. 2 only the tubes for the symbols "0," "1," "8" and "9" are shown, the tubes for the symbols "2" through "7" having been omitted to simplify the showing of the bank of tubes, as their circuits are identical with those for the other symbol representing tubes, and an understanding of the operation of the bank can be had from the circuits shown.

The resetting tube "Reset" is fired by the control impulse which is generated between bursts of impulses and clears any setting of the translating means which has been made according to a preceding burst to allow it to be operated according to a subsequent burst.

The priming tube "Prime" can be fired directly, as is the case when preparing the receiving apparatus for the first burst of signal impulses, and also can be fired automatically by the resetting tube when that tube is fired by the control impulse between bursts. When the priming tube is fired it will extinguish any tube that is conducting, and as long as the priming tube is conducting it will prime the "0" symbol-representing tube and render it responsive to the first impulse of a burst, thus insuring that the operation of the translating means will always begin with the "0" tube.

The symbol-representing tubes are fired one after another in sequence in response to impulses impressed on the firing impulse conductor 103, beginning with the "0" tube and continuing through the "9" tube. As each symbol-representing tube is fired it will extinguish any previously conducting tube and as long as it remains conducting it will prime the next symbol-representing tube in the sequence, so that the next tube may be fired by the next impulse on the firing impulse conductor 103. Under these circumstances, the only tube to be conducting in the bank after a burst of impulses has been received, will be the last one fired in response to the signal impulses, and this tube will correspond to the symbol represented by the burst of impulses. The conducting tube in the bank will control the storing devices so that a representation of this symbol may be stored therein.

As the translating means operates over and over and responds to the signals in the various bursts, it will control the several storage devices one after another to store the symbols represented by the several bursts of signal impulses.

The circuits for supplying the potentials and operative connections between the tubes of the bank are shown in Fig. 2, and are as follows.

Negative potential is supplied to the cathode 235 of the "Reset" tube by a circuit which extends to ground from a negative potential supply conductor 236 to which a negative potential of 150 volts is applied at terminal 237. The circuit for the cathode 235 extends from point 238 on the negative potential supply conductor 236, over the normally closed switch 239, resistor 240 of 200,000 ohms, point 241, resistor 242 of 75,000 ohms, points 243 and 244, and to ground over resistor 245 of 15,000 ohms in parallel with resistor 246 of 2,500 ohms and capacitor 247 of .002 microfarad in series. Cathode 235 of the "Reset" tube is connected to this circuit at point 244, and has a negative potential of about 7.7 volts when the tube is not conducting. When the tube is conducting, the cathode 235 is also conductively coupled to its anode 250 by the discharge path through the tube, so that the positive potential which is applied to the anode will also be impressed on the cathode potential supply circuit and will cause the potential of the cathode to rise from its normal negative potential of slightly less than 8 volts to a positive potential of about 48 volts.

The control grid 251 has a normal negative potential of about 33 volts applied thereto by being connected to a circuit which extends to ground from point 252 on the negative potential supply conductor 236, over resistor 253 of 125,000 ohms, point 254, and resistor 255 of 36,000 ohms. Control grid 251 is connected to point 254 in this circuit over a resistor 256 of 50,000 ohms, point 257 and resistor 258 of 500,000 ohms. Point 257 in the grid circuit is electrostatically coupled to a terminal 259 over a capacitor 260 of 10 micro-microfarads, which terminal 259 is connected to terminal 230 (Fig. 1) and enables the generated control impulse to fire the "Reset" tube after each burst of impulses has been received.

Anode 250 of the "Reset" tube is connected to an anode potential supply conductor 261 which is connected over a resistor 262 of 2,000 ohms, point 263, resistor 264 and point 265 to a terminal 266 upon which a positive potential of 75 volts is applied. Point 263 in this circuit is connected to ground over a stabilizing capacitor of .1 microfarad.

Negative potential is supplied to the cathode 270 of the "Prime" tube by a circuit extending from point 271 on the negative potential supply conductor 236, over a resistor 272 of 150,000 ohms, point 273, resistor 274 of 100,000 ohms, points 275 and 276, and to ground over a resistor 277 of 15,000 ohms in parallel with a resistor 278 of 2,500 ohms, and a capacitor 279 of .002 microfarad in series, to which circuit the cathode 270 is connected at the point 276, and receives a normal negative potential of about 8 volts when the tube is not conducting. As in the case with the "Reset" tube, the potential of the cathode 270 will rise to about 48 volts when the tube is conducting.

The anode 280 of the "Prime" tube is also connected to the anode potential supply conductor 261, and accordingly has a positive potential of 75 volts applied thereto.

The control grid 281 of the "Prime" tube is connected over resistor 282 of 500,000 ohms, and point 283 to the point 241 in the potential supply circuit for the cathode 235 of the "Reset" tube, and is given a normal negative potential of about 46 volts. This negative potential which is applied to the control grid 281, will be sufficient to prevent conduction in the "Prime" tube; however, due to its derivation from the cathode potential supply circuit for the "Reset" tube, the potential rise of the cathode 235 of the "Reset" tube, as that tube becomes conducting, will be reflected on the grid 281 of the "Prime" tube, and will reduce the negative potential on the grid 281 to less than 12 volts negative with respect to the cathode 270, causing the grid to lose control and the "Prime" tube to fire and become conducting automatically. Point 283 in the circuit to grid 281 is connected to ground over a capacitor 284 of 50 micro-microfarads which delays the application of the potential change on the grid 281, and thereby delays the automatic firing of the "Prime" tube after the "Reset" tube has fired and become conducting. The amount of delay obtained can be varied by varying the capacitance of the capacitor 284.

The "Prime" tube is fired, prior to the reception of the first burst of impulses, by temporarily removing the bias from its grid 281. This is accomplished by opening the normally closed switch 239 in cathode potential supply circuit for the cathode 235 of the "Reset" tube, from which circuit the control grid 281 obtains its controlling bias. As soon as the "Prime" tube has fired, the switch 239 is closed to re-apply the controlling bias to the grid 281, so that when the tube has been extinguished, the grid will be effective to regain control to prevent further conduction in the tube until after the "Reset" tube is fired by the control impulses which are generated between the various bursts of signal impulses, and causes the automatic firing of the "Prime" tube, as explained above.

The cathodes of the symbol-representing tubes of the translating means are supplied with appropriate negative potential by similar parallel circuits, one for each tube, extending to ground from the negative potential supply conductor 236. The circuit for the "0" tube is representative and extends from point 290 on the negative potential supply conductor 236, over resistor 291 of 150,000 ohms, point 293, resistor 294 of 100,000 ohms, points 295 and 296, and to ground over resistor 297 of 15,000 ohms in parallel with a resistor 298 of 2,500 ohms and a capacitor 299 of .002 microfarad in series. The cathode 300 of the "0" tube is connected to this circuit at the point 296, and normally has a negative potential of approximately 9 volts when the tube is not conducting. When the tube is conducting, the potential of the cathode 300 will rise to a positive potential of about 48 volts.

The cathode potential supply circuits for all the symbol-representing tubes except the "9" tube are used to supply negative biasing potential for the control grids of the tubes next in the sequence, the connection being from the cathode potential supply circuit of one tube to the control grid of the next tube in the sequence. These connections enable the sequential firing of the tubes by utilizing the potential rise of the cathode of one tube to prime the next tube to be operated, so that the next tube may be fired and rendered conducting when the next impulse is impressed on the firing impulse conductor 183 to which the various control grids are electrostatically coupled. The control grid 301 of the "1" tube, for instance, is connected over a resistor 302 of 50,000 ohms, point 303, and resistor 304 of 500,000 ohms to point 293 in the cathode potential supply circuit for the "0" tube, from which point it derives a normal negative biasing potential of about 65 volts when the "0" tube is not conducting. When the "0" tube becomes conducting, its cathode potential rises, and causes the biasing potential of the control grid 301 of the "1" tube to be reduced almost to the point at which the tube will fire, so that the "1" tube can respond to the next, or second, impulse which is impressed on the firing impulse conductor 103. A capacitor 305 of 250 micro-microfarads is placed across the resistor 294, which is in the circuit between the cathode 300 and the point 293 from which the potential is supplied to the control grid 301, to enable rapid priming action to be obtained by speeding up the application of the potential rise of the cathode 300 to the control grid 301.

The cathode potential supply circuit of the "9" tube, or the last symbol-representing tube in the sequence, is not used to provide the biasing and priming potentials for any control grid so that a single equivalent resistor 310 of 250,000 ohms is included in the circuit between the negative potential supply conductor 236 and the cathode 311 of the "9" tube, instead of the two resistors of 150,000 ohms and 100,000 ohms which are used in the cathode supply circuits for the other symbol-representing tubes.

The "0" tube, being the first symbol-representing tube in the sequence, is not primed by the conduction in any other symbol-representing tube, but is primed by having its control grid 306 connected to the cathode potential supply circuit for the "Prime" tube, the connection extending from the point 273, over a resistor 307 of 500,000 ohms, point 308 and resistor 309 of 50,000 ohms, and operating in a manner similar to the control grid circuits of the other symbol-representing tubes.

The control grids of the symbol-representing tubes "0" through "9" are electrostatically coupled to the firing impulse conductor 103 by means of individual capacitors of 10 micro-microfarads, as capacitor 312, by which the point 303 in the grid circuit of the "1" tube is connected to the firing impulse conductor 103. As explained earlier herein, the firing impulse conductor 103 is connected over terminal 129 (Fig. 2) and terminal 128 (Fig. 1) to circuits by which the phase-changing tube 102 can impress a positive firing impulse on the conductor 103 each time a signal impulse is received. The normal negative bias of the grids of the symbol representing tubes is sufficient to render the firing impulses ineffective to cause the firing of the tubes; however, if any tube has been primed by conduction in another tube, the bias of the primed tube will have been reduced sufficiently that the firing impulse can cause that tube to fire and become conducting.

The anodes of the symbol-representing tubes are connected to the same anode potential supply conductor 261 (Fig. 2) as are the anodes of the "Reset" and "Prime" tubes. The connection of all the anodes to this conductor, which is connected to a source of potential over a resistor which is common to all the tubes, is utilized to enable any tube in the bank, when fired, to extinguish any previously conducting tube in the bank. Specifically, the extinguishing action is as follows.

When none of the tubes in the bank is conducting, all the anodes will have a positive potential of 75 volts, but when any tube is conducting the potentials of the anodes will be reduced to about 63 volts. As explained earlier herein, the cathode of any conducting tube will have risen from its normal negative potential of about 8 volts to a positive potential which is 15 volts less than the potential of its anode.

At the time when any tube is fired, the capacitor, as 247, 279 or 299, in its cathode circuit will prevent the immediate rise of the cathode potential, and this, in connection with the resistor 262 in the anode potential supply circuit, will cause the potential of the anode of the tube being fired to drop momentarily to within 15 volts of the normal cathode potential. Since the anodes of all the tubes of this bank are directly connected to the potential supply conductor 261, the potential of all the anodes will drop with that of the tube that is being fired, and this will cause the potential of the anode of a previously conducting tube to drop below that of its related cathode, which has risen due to the previous conduction in the tube, and will cause the previously conducting tube to be extinguished. After the capacitor in the cathode circuit has become charged, the potential of the anode and cathode of the tube that was fired will rise to positive potentials of about 63 and 48 volts respectively, and will remain at these potentials as long as the tube continues to be conducting.

The operation of the bank of tubes in the translating means is as follows.

When the receiving apparatus is made ready for operation, the "Prime" tube is fired by momentarily opening the switch 239 and removing the negative bias from its grid 281. Conduction in the "Prime" tube will cause the "0" symbol-representing tube to be primed for operation by the symbol-representing impulses impressed on the firing impulse conductor 103.

The first impulse of the first burst will fire the "0" tube, which will extinguish the "Prime" tube and prime the "1" tube. The second impulse of the first burst will fire the "1" tube, which will extinguish the "0" tube and prime the "2" tube. The succeeding impulses of the burst will fire the tubes "2," "3," and so on, depending upon the number of impulses in the burst. At the end of the burst the tube corresponding to the symbol represented by the number of signal impulses in the burst will be conducting.

During the interval or space between the first burst and the second burst, the control impulse generating means will operate to generate a control impulse which is impressed on the "Reset" tube of the bank of tubes in the translating means. When the control impulse is impressed on the "Reset" tube, that tube will fire and become conducting, the firing of the "Reset" tube extinguishing the symbol-representing tube which remained conducting at the end of the reception of the first burst, and causing the automatic firing of the "Prime" tube.

The firing of the "Prime" tube will extinguish the "Reset" tube, and the conduction in the "Prime" tube will again prime the "0" tube to enable it to respond to the first impulse of the second burst. The remaining impulses of the second burst will cause the sequential firing of the symbol-representing tubes to provide a direct representation of the second symbol which was received.

In the interval between the second and third bursts of impulses, the control impulse generating means will again operate and fire the "Reset" tube, which will extinguish any previously conducting tube and automatically fire the "Prime" tube to prepare the symbol-representing tubes for operation by the signal impulses of the third burst of impulses.

The "Reset" and "Prime" tubes will be operated in a similar manner between the succeeding bursts of impulses and will enable the single bank of tubes in the translating means to be used over and over to translate the signal impulses in the various bursts into direct representations of the symbols represented by the different numbers of impulses in the bursts.

Conductors extend from the cathode potential supply circuits of the symbol-representing tubes and enable the rise in potential of the cathode of any conducting symbol-representing tube to be used to control the firing of the storage devices. In Fig. 2, only the conductors 315, 316, 317, and 318, which extend from the "0," "1," "8," and "9" tubes, respectively, are shown. The storage devices and the manner in which the symbol-representing tubes control the storage devices will now be explained.

*Storage devices*

The disclosed embodiment of the invention is shown as having a capacity for storing five symbols which may be received automatically in succession, but it is not intended that the invention be limited to this capacity, as the number of storage devices may be increased or decreased, as desired, without departing from the substance of the invention.

As the storage devices and their controlling and operating circuits are similar and the devices operate in a similar manner, it is believed that the construction and operation of the storage devices will be clear from the following description of the "I" storage device, which stores the first symbol to be received.

Figure 3:
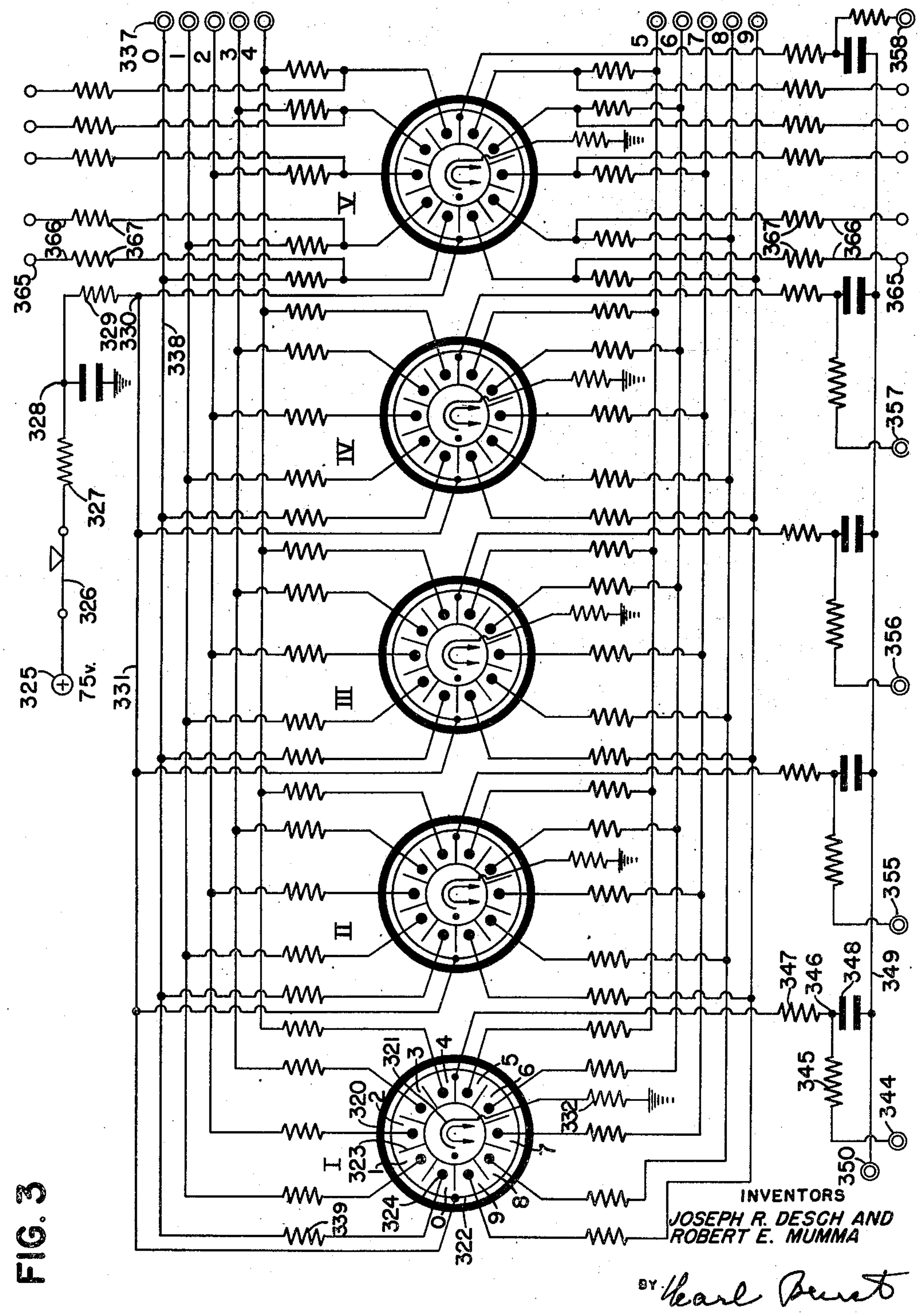
Fig. 3 shows the plurality of storage devices which may be controlled by the translating means and rendered operable one after another to store the various symbols making up the data which is received.

The "I" storage device (Fig. 3) is a gaseous electron tube 320 having an electrode arrangement which enables a plurality of separate discharge paths, one for each possible symbol, to be obtained in an ionizable medium in a single envelope. The tube 320 includes a central heated cathode 321, a cylindrical anode 322 surrounding the cathode 321, a shielding electrode 323 located between the cathode 321 and the anode 322 and dividing the gaseous medium between the cathode and the anode into the plurality of discrete symbol-representing discharge paths, and a control electrode 324 in each discharge path to control selectively in which path conduction will occur when the tube is operated.

A storage device having this electrode arrangement is shown in our co-pending application Serial No. 489,506, which has matured into Patent No. 2,419,485.

A positive potential of 75 volts is applied to the anode 322 from terminal 325 over normally closed switch 326, resistor 327 of 250 ohms, point 328, resistor 329 of 250 ohms, point 330, and anode potential supply conductor 331. Point 328 in this circuit is connected to ground over a stabilizing capacitor of .1 microfared. Cathode 321 is connected to ground over a resistor 332 of 15,000 ohms.

The control electrodes in the individual discharge paths are connected to the symbol-representing tubes of the translating means and enable the symbol-representing tubes of the translating means to control in which path conduction will occur when the tube 320 is fired and rendered conducting. The connection for the control electrode 324 in the "0" symbol-representing discharge path, which is representative of these connections, extends from point 335 (Fig. 2) in the cathode potential supply circuit for the "0" symbol-representing tube, over conductor 315, terminal 336, which is connected to terminal 337 (Fig. 3) the "0" conductor 338, and resistor 339 of 1,200,000 ohms. By means of this circuit, the control grid 324 will have applied thereto the same potential as the cathode 300 of the "0" symbol-representing tube when the tube is in its conducting and non-conducting condition. Similar connections between the cathode potential supply circuits for the other symbol-representing tubes in the translating means and their related control electrodes in the tube 320 provide the control electrodes with potentials which are similar to their related cathode potentials.

It will be recalled that the cathodes in the symbol-representing tubes of the translating means have a negative potential of about 8 volts when their respective tubes are not conducting, and have a positive potential of about 48 volts when their respective tubes are conducting. It will also be recalled that, at the end of any translating operation, only that tube which corresponds to the symbol will be conducting, and this means that the cathodes of all the tubes except that of the conducting tube will be at a negative potential, while the cathode of the conducting tube will be at a positive potential. Accordingly, at the end of any translating operation, the control electrode in one of the discharge paths will be at a positive potential, while the control electrodes in the remaining paths will be at a negative potential, and this will determine the discharge path in which conduction will occur when the tube 320 is fired and rendered conducting.

The shielding electrode 323, which cooperates with the control electrodes 324 to control conduction in tube 320, is given a normal negative potential of about 55 volts over a circuit which extends from point 340 (Fig. 4) in the cathode potential supply circuit for the "I" control tube 341, over conductor 342, terminal 343, which is connected to terminal 344 (Fig. 3), resistor 345 of 500,000 ohms, point 346, and resistor 347 of 50,000 ohms. The point 346 in this circuit to the shielding electrode 323 is electrostatically coupled over a capacitor 348 of 10 micro-microfarads to a firing impulse conductor 349, which is connected over terminal 350 to terminal 230 (Fig. 1) and has the generated control impulse impressed thereon as a firing impulse between the various bursts of impulses.

The negative potential of about 55 volts is applied to the shielding electrode 323 when the "I" control tube 341 is not conducting. This potential will be sufficient to prevent the potential changes on the control electrodes and the firing impulses on the conductor 349 from causing conduction to occur in any of the discharge paths in tube 320; however, when the control tube 341 becomes conducting, the potential of its cathode will become positive in a manner similar to that explained above in connection with the tubes of the translating means, and this will prime the tube 320 by reducing the negative potential on the shielding electrode to a point where the firing impulse on conductor 349, when applied to the shielding electrode 323, will cause conduction to occur in the discharge path whose control electrode is at a positive potential.

When conduction occurs in any discharge path, the resistor 332 in the circuit between the cathode 321 and ground will cause the potential of the cathode 321 to rise to within 15 volts of that of the anode, which potential difference will support conduction in the discharge path, but will not be sufficient to initiate conduction in a discharge path. Since the anode and the cathode are common to all the discharge paths, as soon as conduction takes place in any discharge path, the potential between the anode and the cathode will drop so that conduction cannot be initiated in any other discharge path in the tube.

Once conduction occurs in any discharge path in a tube, it will continue until the anode potential supply is interrupted; accordingly, the discharge in the storage devices will serve to store the data and to make it available for further use.

In a manner similar to that described above, other storage tubes have their cathodes grounded over 15,000 ohm resistors and their anodes connected to the anode potential supply conductor 331, and also have their control electrodes connected over resistors of 1,200,000 ohms to the digit conductors, as 338, which extend to the cathode potential supply circuits for the symbol-representing tubes of the translating means.

The shielding electrodes of the "II," "III," "IV," and "V" storage devices are electrostatically coupled to the firing impulse conductor 349 and are connected respectively over terminals 355, 356, 357, and 358 to terminals 359, 360, 361 and 362 (Fig. 4), which are connected to conductors extending from cathode potential supply circuits for the "II," "III," "IV," and "V" control tubes in the switching means and enable these control tubes to prime the storage devices one after another as the second, third, fourth, and fifth bursts of signals are received, so that the symbols represented by these bursts will be stored in the devices in proper sequence.

The storage devices may be used to control means to indicate and/or record the symbols which are stored therein. After the storage devices have been operated to store symbols, the control electrode in each device which is located in the discharge path which is conducting, will have a positive potential, while the other control electrodes will have a negative potential. By providing a scanning switch for each storage device and connecting the control electrodes to contacts as 365 of the scanning switch over conductors as 366 and resistors as 367 of 500,000 ohms, these differences in potential can be sensed and used to control the setting of any suitable indicating or recording means. The scanning switch has been shown schematically in connection with the "V" storage device in Fig. 3, but it is to be understood that a similar scanning switch and similar connections are provided for each of the storage devices.

After the data has been indicated or recorded and it is desired to use the receiving apparatus to receive further data, the symbols stored in the storage devices can be cleared therefrom by the momentary opening of switch 326 in the potential supply circuit for the anodes of all the storage devices, which will cause conduction to cease in all the storage devices, thus preparing them for the reception of further data.

In the disclosed embodiment, each storage device is shown as consisting of a plurality of discharge paths in a single envelope; however, the invention is not limited to the use of such storage devices, as separate tubes for each discharge path or other equivalent arrangements may also be used to store the symbols without departing from the substance of the invention.

*Switching means*

Figure 4:
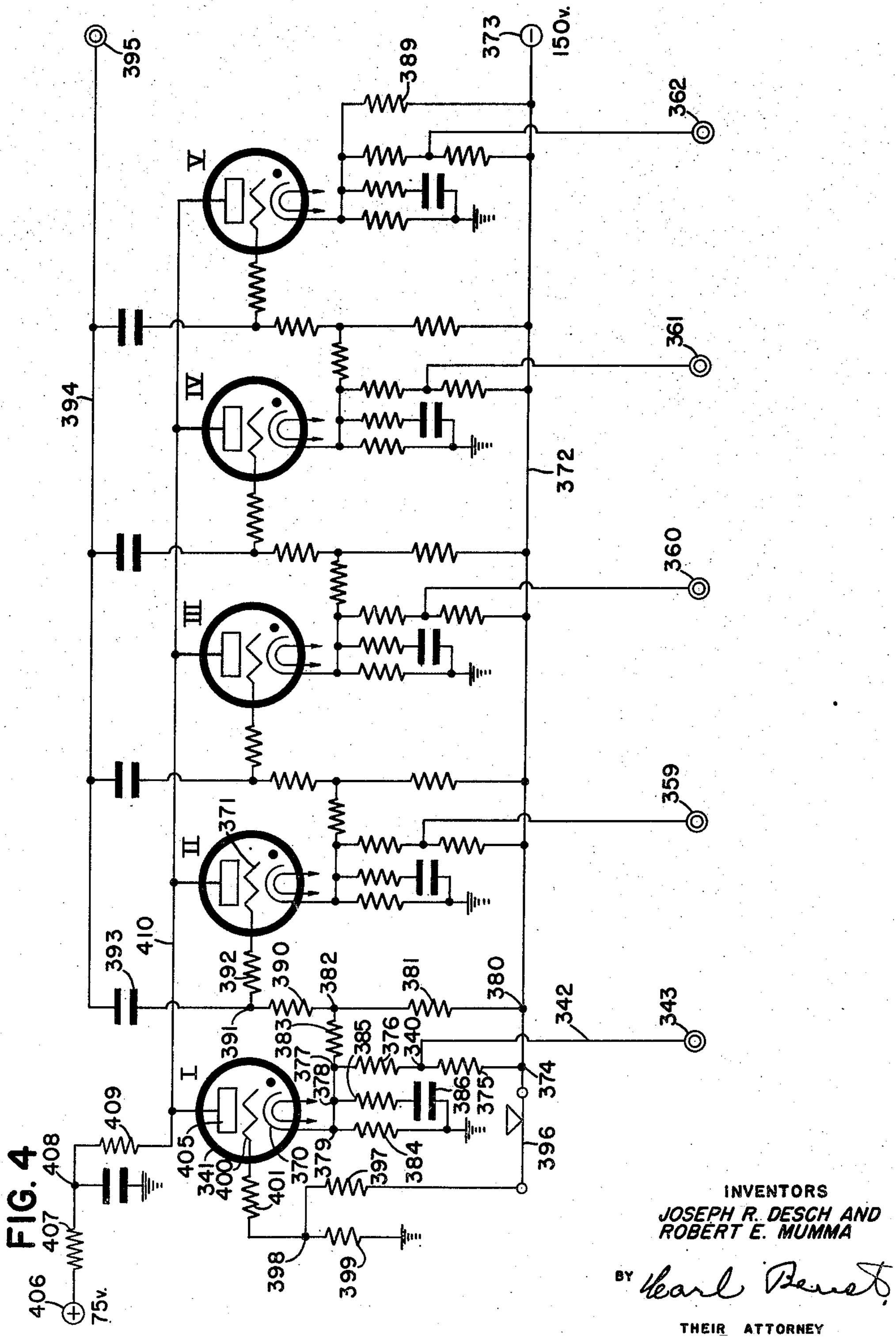
Fig. 4 shows a switching means which is operated by the control signal after each burst of signals has been received and which is effective to control the allocation of the symbols in the various storage devices.

The switching means for controlling the storage devices, so that the various symbols will be stored in the proper storage devices, is shown in Fig. 4, and includes a control tube for each storage device, and these control tubes, which are gaseous electron tubes of the same type as those used in the translating means, are connected for sequential step-by-step operation each time a control impulse is generated between bursts of impulses. The control tubes in Fig. 4 are given the reference numerals "I," "II," "III," "IV," and "V," which are similar to those used in connection with the storage devices controlled thereby and indicate with which burst they are to be operative.

As each control tube is fired, it will extinguish any previously conducting control tube, and, while a control tube is conducting, it will prime its related storage device to render it effective to store the symbol representing the burst being received and translated, and will also prime the next control tube in the sequence so that it will fire and become conducting when the next control impulse is impressed on the control tubes of the control means.

Inasmuch as a control impulse is generated in the receiving apparatus after each burst has been received, it is necessary to fire the first control tube in the sequence before the first burst of signal impulses is received. The firing of the first control tube will extinguish any previously conducting control tube which might have remained conducting from a previous operation of the apparatus, and insures that the symbol represented by the first burst will be stored in the proper storage device provided therefor.

As the circuits associated with the various tubes of the switching means are similar, it is believed that the operation of the switching means will be clear from a description of representative circuits.

Negative potential is supplied to cathode 370 of the "I" control tube 341 by a circuit which has two branches, one of which is also utilized to supply the required negative potential to the shielding electrode 323 of the "I" storage device, and the other of which is also utilized to supply the required negative potential to the control grid 371 of the "II" control tube. Said one branch extends from a negative potential supply conductor 372, to which a negative potential of 150 volts is applied at terminal 373, and continues over point 374, resistor 375 of 300,000 ohms, point 340, and resistor 376 of 150,000 ohms to points 377, 378, and 379. The other branch extends from the potential supply conductor 372 at point 380 and continues over resistor 381 of 300,000 ohms, point 382, and resistor 383 of 200,000 ohms to the points 377, 378 and 379. From the points 378 and 379, the two branches continue to ground over resistor 384 of 15,000 ohms in parallel with resistor 385 of 2,500 ohms and capacitor 386 of .002 microfarad in series. The cathode 370 is connected at point 379 in this circuit and is given a negative potential of approximately 7 volts whenever the tube is not conducting. When the tube is conducting, the electron discharge therein enables a positive potential applied to the anode to be applied to the cathode and will cause the potential of the cathode to rise to a positive potential of about 48 volts.

As explained earlier herein, a circuit extends from point 340 in said one branch and continues over conductor 342 and terminal 343, which is connected to terminal 344 (Fig. 3) and supplies a negative biasing potential of about 55 volts to the shielding electrode 323 for the storage device which stores the first symbol. This circuit also enables the potential rise of the cathode 370, due to conduction in the control tube, to be used to reduce the negative potential on the shielding electrode to prime the storage device.

A circuit extends from said other branch of the cathode potential supply circuit at point 382 and continues over resistor 390 of 500,000 ohms, point 391, and resistor 392 of 50,000 ohms to the control grid 371 of the "II" control tube to supply this grid with a normal negative potential of about 64 volts. This circuit enables the "II" tube to be primed by having this negative potential reduced almost to the critical point by the potential rise of cathode 370 when the "I" tube is conducting.

Since the "V" control tube is the last tube of the sequence, it is not required to provide the controlling and priming potentials for the control grid of another control tube, so that the branch of its cathode potential supply circuit which normally would supply such potentials can be simplified by the use of a single equivalent resistor 389 of 500,000 ohms instead of separate resistors of 200,000 and 300,000 ohms.

The control grid of the "II" tube is connected over point 391 and capacitor 393 of 10 micro-microfarads to an impulse conductor 394, which is connected over terminal 395 to terminal 230 (Fig. 1), upon which is impressed a positive impulse by the control impulse generating means after each burst of impulses has been received. The control grids of the "III," "IV," and "V" control tubes are similarly coupled to conductor 394, but the positive impulses will be able to fire only that tube of the bank which has been primed.

The "I" tube is the first tube in the sequence, and its grid cannot derive its negative controlling potential from the cathode potential supply circuit of a preceding tube. A circuit extending from point 374 on the negative potential supply conductor 372 and over the normally closed switch 396, resistor 397 of 125,000 ohms, point 398, and resistor 399 of 36,000 ohms to ground supplies grid 400 with a negative biasing potential of about 32 volts over point 398 and resistor 401 of 500,000 ohms.

Since the control tubes are fired in response to control impulses which are generated after the bursts have been received, the "I" control tube must be fired in a different manner before the first burst is received, in order that the "I" storage device will be primed and can be fired by the first control impulse that is generated. This firing of the "I" control tube may be accomplished in any convenient manner; for instance, the normally closed switch 396 may be momentarily opened to remove the negative potential from the control grid 400, which will cause the "I" control tube to fire and become conducting. As soon as the "I" control tube has fired, the switch 396 may be reclosed to enable the grid 400 to resume control when conduction is extinguished in the "I" control tube by the firing of the "II" control tube.

Potential is applied to the anode 405 of the "I" control tube by means of a circuit starting at terminal 406, upon which is impressed a positive potential of 75 volts, and extending over resistor 407 of 250 ohms, point 408, resistor 409 of 2,000 ohms, and conductor 410, to which anode 405 is connected. The anodes of the other tubes are also connected to conductor 410, and, when none of the tubes is conducting, the potential of the anodes will be 75 volts, but, when any tube is conducting, this potential is reduced to about 65 volts due to the resistors 407 and 409. Point 408 in this circuit is connected to ground over a capacitor of .1 microfarad to absorb the shock of an abrupt application of or change in potential in this circuit. The common resistance in the anode potential supply circuit enables the firing of any tube of the switching means to extinguish conduction in any previously conducting tube in the switching means in the manner explained earlier herein in connection with the operation of the translating means.

The switching means is operated prior to the reception of the first burst of signal impulses by momentary removal of the negative potential from the control grid 400 of the "I" control tube, which causes that tube to fire and become conducting.

When the "I" control tube is fired, it will extinguish any tube which is conducting from a previous operation of the apparatus, and while the "I" control tube is conducting, it will prime the "I" storage device and the "II" control tube.

At the end of the first burst of signal impulses, the control impulse which is generated will be effective to cause the "I" storage device to fire and conduction to occur in the path corresponding to the symbol represented by the first burst of impulses. The control impulses will also be effective to fire the "II" control tube.

The "II" control tube, when fired, will extinguish the "I" control tube, which will remove the prime from the "I" storage device and the "II" control tube. Conduction in the "II" control tube will prime the "II" storage device and the "III" control tube to enable them to be fired by the control impulse which is generated after the second burst of impulses has been received.

In a similar manner, the firing of the "III" control tube extinguishes the "II" control tube, and the conduction in the "III" control tube applies a prime to the "III" storage device and the "IV" control tube. Further control impulses, which are generated after subsequent bursts of signal impulses are received, will cause the firing of the "IV" and the "V" control tubes one after another, which tubes will cause the "IV" and the "V" storage devices to be primed in proper order to store the symbols which have been translated by the translating means.

From the above description, it is clear that the control tubes in the switching means will be fired one after another as the control impulses are generated after the successive bursts are received, and will prime the storage devices one after another in succession to enable the symbols, which are represented by the bursts of signal impulses and are received and translated automatically one after another in succession, to be stored in their proper storage devices.

*Operation*

It is believed that the operation of the several component parts of the receiving apparatus is clear from the above description, so that only a brief description of the operation of these component parts as coordinated in the apparatus as a whole will be given at this time.

The receiving apparatus is prepared for the reception of data by the momentary opening of the three switches 239, 396, and 326, which are effective, respectively, to fire the Prime tube in the translating means, which primes the "0" symbol-representing tube for operation; to fire the "I" control tube in the switching means, which primes the "I" storage device for operation; and to clear the storage devices of any setting which might have remained therein from a previous operation.

The incoming spaced bursts of negative impulses are impressed on the input terminal of the receiving apparatus, and each impulse will be effective to cause the operation of the phase-changing tube 102, which simultaneously sends a positive impulse to the translating means and to the control impulse generating means for each received signal impulse.

As the first burst is received, the positive impulses will condition the control impulse generating means so that it can generate a control impulse during the interval between the first and second bursts. These positive impulses will also cause the operation of the symbol-representing tubes in the translating means, one at a time in sequence, to translate the number of impulses in the burst into a direct representation of the symbol corresponding to this number of impulses.

After the first burst is received, the control impulse generating means will produce the first control impulse, which is effective to cause three operations to take place. It causes the "I" storage device to fire and cause conduction to occur in the discharge path corresponding to the last symbol-representing tube to operate in the translating means to thereby store the symbol corresponding to the first burst. The control impulse also fires the "Reset" tube in the translating means to reset or prepare the translating means for another translating operation and fires the "II" control tube in the control means to prime the "II" storage device for operation to store the symbol which the second burst represents.

The second burst of signals will operate the translating means to set up a direct representation of the symbol according to the number of impulses in the second burst and will also condition the control impulse generating means so that it can generate a second control impulse during the interval between the second and third bursts.

The second control impulse, which is generated at this time, will fire the "II" storage device to store the second symbol therein, will fire the "Reset" tube of the translating means and prepare it for a further translating operation, and will fire the "III" control tube to prepare the "III" storage device for operation.

The third, fourth, and fifth bursts of signals follow and control the apparatus, in a similar manner to that explained above, to store the third, fourth, and fifth symbol in the "III," "IV," and "V" storage devices.

With the capacity of the disclosed embodiment, the receiving operation is completed when the five bursts have been received. At this time, the five symbols will be stored in the storage devices, which symbols can be used to control any suitable indicating and/or recording device to provide an indication or a record of the symbols as desired.

While the form of mechanism herein shown and described is admirably adapted to fulfill the objects primarily stated, it is to be understood that it is not intended to confine the invention to the form or embodiment herein disclosed, for it is susceptible of embodiment in various forms all coming within the scope of the claims which follow.

What is claimed is:

1. In a receiving apparatus, the combination of a data storage device consisting of a gaseous electron tube having a cathode, an anode, a shielding electrode providing a plurality of discrete discharge paths between the cathode and the anode in the gaseous medium, and a plurality of control electrodes, one in each discharge path; means to provide anode-cathode potential for the tube; means for providing a normal blocking potential to the shielding electrode to prevent conduction in all of the discharge paths; control means to provide blocking potential for the control electrodes in all of the paths, said control means being selectively operable to remove the blocking potential from any one of the control electrodes; and means to apply a firing potential impulse to the shielding electrode to overcome the blocking potential thereon and cause conduction to occur in that discharge path in which the blocking potential has been removed from the control electrode.

2. In a receiving apparatus, the combination of a data storage device consisting of a gaseous electron tube having a cathode, an anode, a shielding electrode providing a plurality of discrete discharge paths between the cathode and the anode in the gaseous medium, and a plurality of control electrodes, one in each discharge path; means to provide anode-cathode potential for the tube; means for providing a normal blocking potential to the shielding electrode to prevent conduction in all of the discharge paths; a plurality of individually operable control means; means connecting the control electrodes to related control means which provide blocking potential for the control electrodes when the control means have not been operated, said control means when operated being effective to remove the blocking potential from its related control electrode; and means to apply a firing potential impulse to the shielding electrode to overcome the blocking potential thereon and cause conduction to occur in that discharge path in which the blocking potential has been removed from the control electrode.

3. In a receiving apparatus, the combination of a data storage device consisting of a gaseous electron tube having a cathode, an anode, a shielding electrode providing a plurality of discrete discharge paths between the cathode and the anode in the gaseous medium, and a plurality of control electrodes, one in each discharge path; means to provide anode-cathode potential for the tube; means connected to the shielding electrode for providing a normal blocking potential to the shielding electrode to prevent conduction in all of the discharge paths; differentially operable control means connected to the control electrodes to provide blocking potential for the control electrodes in all of the paths, said control means being selectively operable according to the differential operation thereof to remove the blocking potential from any one of the control electrodes; and means to apply a firing potential impulse to the shielding electrode to overcome the blocking potential thereon and cause conduction to occur in that discharge path in which the blocking potential has been removed from the control electrode.

4. In an apparatus of the class described, the combination of differentially operable means containing a plurality of gaseous electron tubes and circuits interconnecting the tubes so that they can be fired and rendered conducting one at a time in sequence rapidly in response to electrical impulses impressed on the tubes; means to impress rapidly recurring electrical impulses on the tubes; a data storage device consisting of an anode, a cathode, a shielding electrode, and a plurality of control electrodes in a single gaseous medium, the electrode arrangement enabling a discrete discharge path to be obtained for each control electrode in said gaseous medium; means to provide anode-cathode operating potential for the data storage device; means connected to the shielding electrode to apply a normal blocking potential to the shielding electrode to prevent conduction in any of the discharge paths; means connecting the control electrodes individually to the electron tubes in the differentially operable means, said connections providing the control electrodes with a blocking potential when the related tubes are not conducting but enabling the blocking potential to be removed from a control electrode when its related tube is conducting; and means to apply a firing potential impulse to the shielding electrode to enable that electrode to be effective, in conjunction with a control electrode whose blocking potential has been removed, to cause conduction to occur in the discharge path associated with that control electrode.

5. In an apparatus of the class described, the combination of a plurality of data storage means, each including a plurality of discrete electron-discharge paths, each assigned to represent predetermined data, and a first and a second control electrode in each discharge path; selector means connected to the first control electrodes for providing a normal blocking potential for said first control electrodes in all the paths in all the storage means to prevent a discharge from occurring in any of the paths, said selector means being operable to select the various storage means for operation by reducing the blocking potential on said first control electrodes associated with the several storage means, as the storage means are selected for operation, to a point which will allow a firing impulse to overcome the blocking action of these control electrodes; control means connected to said second control electrodes to provide blocking potential for said second control electrodes in all of the paths, said control means being selectively operable to remove the blocking potential from the second control electrodes in corresponding discharge paths in the several storage means according to data to be stored; and means to apply firing potential impulses to the first control electrodes in all the storage means, said impulses being effective on the first control electrodes of any selected storage means to enable these electrodes, in conjunction with the second control electrodes therein, to cause conduction in the discharge path of the selected storage means thereby to store a representation of data as determined by the second control electrode which has had its blocking potential removed by the control means.

6. In an apparatus of the class described, the combination of a plurality of data storage means, each including a plurality of discrete electron discharge paths, each assigned to represent predetermined data, and a first and a second control electrode in each discharge path; selecting means sequentially operable to select the storage means for operation one after another in succession, said selecting means being connected to said first control electrodes and providing a normal blocking potential for said first control electrodes to prevent a discharge in any of the discharge paths and being effective to select the storage means for operation by reducing the blocking potential on said first control electrodes associated with the several storage means, as the storage means are selected for operation, to a point which will allow a firing impulse to overcome the blocking action of these control electrodes; control means connected to said second control electrodes to provide blocking potential for said second control electrodes in all of the discharge paths, said control means being selectively operable to remove the blocking potential from the second control electrodes in corresponding discharge paths in the several storage means according to data to be stored; and means to cause an operation of the selecting means and to cause a firing impulse to be impressed on said first control electrodes, said firing impulse causing conduction to occur in the discharge path of a selected storage means thereby to store a representation of data as determined by the second control electrode which has had its blocking potential removed, and said operation of the selecting means causing a further selection of a storage means to be made.

7. In a receiving apparatus, the combination of a plurality of data storage devices, each storage device consisting of a gaseous electron tube having a cathode, an anode, a shielding electrode providing a plurality of discrete discharge paths between the cathode and the anode in the gaseous medium, and a plurality of control electrodes, one in each discharge path; means to provide anode-cathode potential for the tubes; means connected to the shielding electrodes to provide a normal blocking potential to the shielding electrodes of the tubes to prevent conduction in the discharge paths of all the tubes, said means being operable to reduce the blocking potential selectively on shielding electrodes of the tubes one after another to a point which will allow the tubes to respond to firing impulses impressed thereon; control means connected to the control electrodes in all the tubes to provide blocking potential for the control electrodes in all of the paths, said control means being selectively operable to remove the blocking potential from control electrodes in corresponding paths in all the tubes; and means to apply a firing potential impulse to the shielding electrodes which tends to overcome the blocking potential thereon and causes conduction to occur in that discharge path in that tube in which the blocking potential has been removed from the control electrode and the blocking potential has been reduced on the shielding electrode.

8. In a receiving apparatus, the combination of a plurality of data storage devices, each storage device consisting of a gaseous electron tube having a cathode, an anode, a shielding electrode providing a plurality of discrete dicharge paths between the cathode and the anode in the gaseous medium, and a plurality of control electrodes, one in each discharge path; means to provide anode-cathode potential for the tubes; means connected to the shielding electrodes to provide a normal blocking potential to the shielding electrodes of the tubes to prevent conduction in the discharge paths of all the tubes, said means being operable step by step in response to impressed impulses to reduce the blocking potential selectively on shielding electrodes of the tubes, one after another, to a point which will allow the tubes to respond to firing impulses impressed thereon; control means connected to the control electrodes in all the tubes to provide blocking potential for the control electrodes in all of the paths, said control means being selectively operable to remove the blocking potential from similar control electrodes in all the tubes; impulse generating means; means connecting the step-by-step operating means to the impulse generating means for operation thereby each time an impulse is generated;

and means connected to the impulse generating means to apply firing potential impulses to the shielding electrodes, which impulses tend to overcome the blocking potential thereon and cause conduction to occur in that discharge path in that tube in which the blocking potential has been removed from the control electrode and the blocking potential has been reduced on the shielding electrode.

9. In a receiving apparatus responsive to spaced bursts of impulses containing variable numbers of electrical signal impulses, which impulses, by their number, represent the symbols making up the data that is received, the combination of an input means upon which the incoming impulses are impressed; a control impulse generating means controlled from the input means and conditioned by the signal impulses of a burst to generate a control impulse in the interval or space between bursts of signal impulses; differentially operable translating means including a group of gaseous electron tubes containing a priming tube and a symbol-representing tube for each possible symbol which might be received, each of said tubes including at least an anode, a cathode, and a control grid, circuits connecting the tubes, cathode-to-control grid, for operation in sequence beginning with the priming tube, to enable conduction in a tube to prime the next tube in the sequence for operation by impressed impulses, and extinguishing connections between similar electrodes in the tubes so that conduction beginning in any tube will extinguish any previously conducting tube of the group; means coupling the symbol-representing tubes to the input means to enable impulses from the input means to be impressed on the symbol-representing tubes to cause their operation one at a time in sequence to translate the number of signal impulses in a burst into a direct representation of the symbol represented thereby; resetting means for the translating means, said resetting means including a gaseous electron tube and a circuit connecting a similar electrode in the resetting tube to said extinguishing connections to enable conduction in the resetting tube to extinguish any previously conducting tube to clear the translating means of the setting according to a previous translating operation and also including a circuit to enable conduction in the resetting tube to fire the priming tube and prepare the translating means for a further translating operation; and connections between the control impulse generating means and the resetting means enabling the control impulse, which is generated after each burst has been received, to cause the resetting tube to be fired to extinguish any previously conducting tube and to fire the priming tube to prepare the translating means for a further translating operation, whereby the translating means may be operated automatically over and over to translate the several bursts of impulses into the symbols represented thereby.

10. In an apparatus of the class described, the combination of a group of gaseous electron tubes containing a priming tube and a plurality of other tubes which are operable in response to impressed impulses, each of said tubes including at least an anode, a cathode, and a control grid; cathode-to-control-grid circuits connecting the tubes in an operating sequence beginning with the priming tube, said circuits enabling conduction in a tube to prime the next tube in the sequence for operation by the next impressed impulse; extinguishing connections between similar electrodes in the tubes so that conduction beginning in any tube will extinguish conduction in any previously conducting tube of the group; means coupled to said plurality of other tubes to impress electric impulses thereon to cause their sequential operation; resetting means including a gaseous electron tube having at least an anode, a cathode, and a control grid; means connecting a similar electrode of the resetting tube to the extinguishing circuit for the group of tubes; a cathode-to-control-grid circuit between the resetting tube and the priming tube to enable the resetting tube to cause conduction to occur in the priming tube; and means to cause conduction to occur in the resetting tube, said resetting tube, when rendered conducting, extinguishing any previously conducting tube of the group and causing the priming tube to become conducting to insure that the sequential operation of the tubes of the group will begin at the beginning of the sequence, and said priming tube extinguishing the resetting tube so that the resetting tube will be in condition for another resetting operation.

JOSEPH R. DESCH.
ROBERT E. MUMMA.

REFERENCES CITED

The following references are of record in the file of this patent:

UNITED STATES PATENTS

| Number | Name | Date |
|---|---|---|
| 2,048,081 | Riggs | July 21, 1936 |
| 2,089,430 | Roys et al. | Aug. 10, 1937 |
| 2,189,317 | Koch | Feb. 6, 1940 |
| 2,199,634 | Koch | May 7, 1940 |
| 2,272,070 | Reeves | Feb. 3, 1942 |
| 2,308,778 | Prince | Jan. 19, 1943 |
| 2,319,333 | Logan et al. | May 18, 1943 |
| 2,379,093 | Massonneau | June 26, 1945 |